Patented Dec. 3, 1935

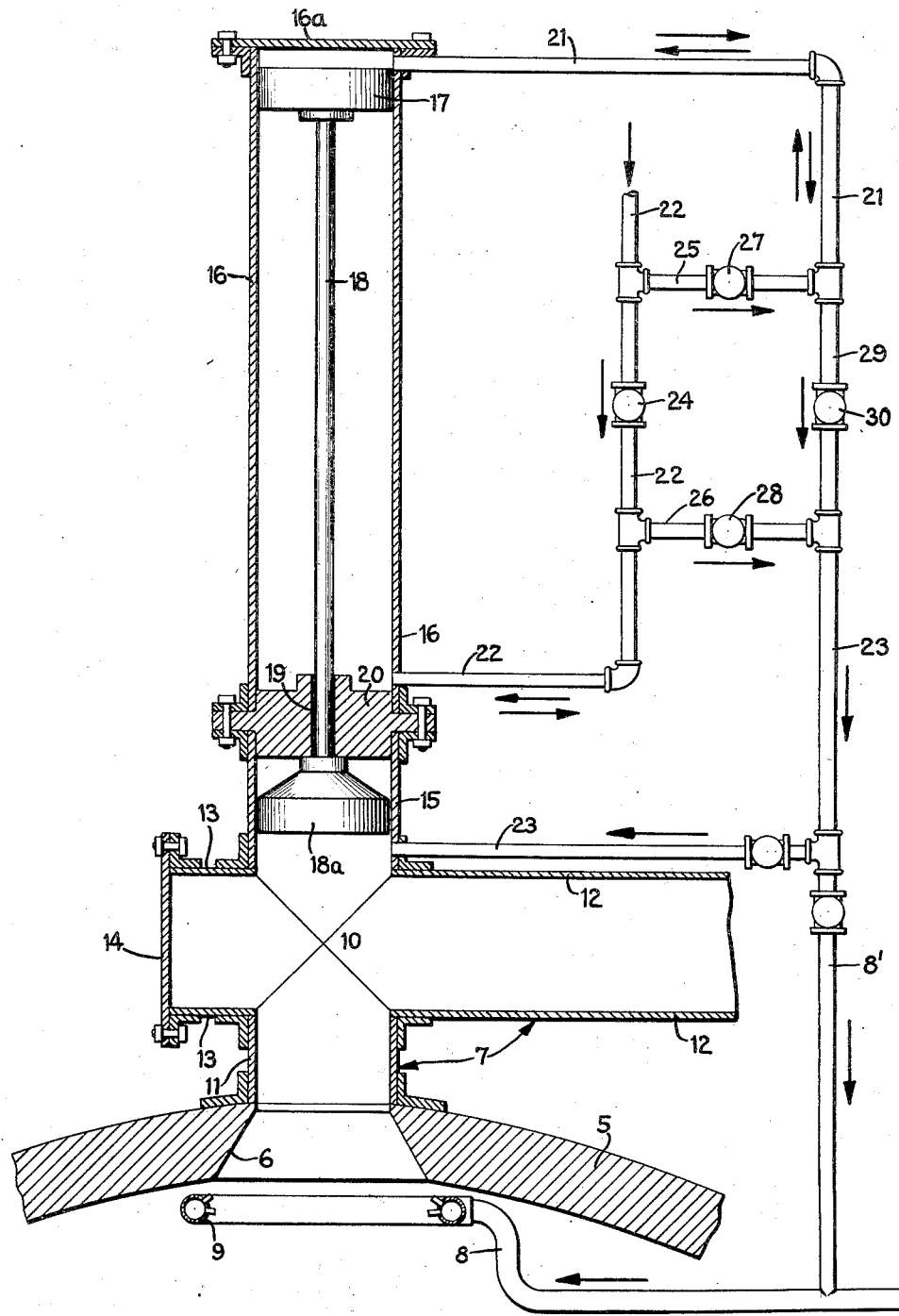

2,022,985

UNITED STATES PATENT OFFICE 2,022,985

ART OF CONVERTING HYDROCARBON OILS

Harold R. Snow, Hammond, Ind., and Russell L. Zimmerman, Chicago, Ill., assignors to Standard Oil Company (Indiana), Chicago, Ill., a corporation of Indiana Application July 30, 1932, Serial No. 626,347

7 Claims. (Cl. 196—122)

The present invention relates to the art of converting hydrocarbon oils and refers more particularly to improved method and apparatus for effecting the removal of accumulated reaction products from certain points within the conversion zone or reaction chamber employed in connection with the conversion of such oils. The invention is particularly adapted to be employed for the removal of more or less solid reaction products, such as coke, carbon, etc., from the vicinity of the outlet of the reaction zone or chamber through which the converted products are withdrawn and may be used in connection with the reaction zone or chamber employed for the conversion of hydrocarbon oils in the so-called "liquid-phase", "vapor-phase" or "mixed vapor-liquid-phase."

The invention more specifically embraces a fluid operated mechanism, for removing such deposits or accumulations, which is operated by fluid supplied to the conversion system. For example, the fluid may comprise a relatively cool fluid to be employed for the cooling of reaction products or it may comprise oil which is to be treated in the system and which may also, if desired, be employed as a cooling agent for the reaction products.

The invention will be fully understood from the following detailed description in conjunction with the accompanying drawing which is a somewhat diagrammatic sectional view of a device embodying the present invention for removing accumulated solid reaction products from the vicinity of the outlet of a reaction chamber in which hydrocarbon oils are subjected to cracking.

Referring more in detail to the drawing, the numeral 5 indicates a portion of the wall of an enlarged reaction chamber in which hydrocarbon oils are subjected to cracking or conversion. The wall of the reaction chamber 5 is provided with an opening 6 connected to a conduit 7 secured in a suitable manner to the exterior of the chamber 5, whereby reaction products may be withdrawn from the chamber 5 and passed to any desired point. In the particular embodiment illustrated, the upper portion of the reaction chamber is adapted to contain hydrocarbon vapors undergoing conversion, the vaporous products of conversion being withdrawn through the conduit 7 and passed to suitable condensing means not shown. As disclosed in the copending application of H. R. Snow, Serial No. 428,430 filed February 14, 1930, it is sometimes desirable, with a reaction chamber containing vapors undergoing conversion, to spray a relatively cool fluid or liquid in the vicinity of the outlet for the vaporous conversion products for the purpose of cooling the reaction products and for retarding accumulation of coke and other reaction products which tend to obstruct the outlet for such vaporous reaction products. In order to provide such a spray of cool fluid, the interior of the chamber 5 is provided with a line 8 leading from a suitable source of cool fluid or liquid, the outlet of the line 8 being provided with an upwardly directed annular spray head 9 disposed below the outlet opening 6.

The outlet conduit 7 preferably comprises a four-way or "cross" fitting 10, one branch 11 of which extends downwardly and is connected to the chamber 5 and communicates with the chamber outlet opening 6. A pair of horizontal branches 12 and 13 lead from the fitting 10, the branch 12 leading to any desired point, for example a fractionating or condensing means, and the branch 13 is preferably closed by means of a blind flange-plate 14 which may be removed for cleaning purposes. The remaining branch 15 of the fitting 10 extends vertically and is substantially in alignment with the branch 11. The end of the branch 15 is secured to one end of an elongated cylinder 16 the opposite end of which is closed by means of a plate 16a.

The cylinder 16 is provided with a piston 17 to which is secured a downwardly extending piston or plunger-rod 18. The lower end of the plunger rod 18 extends through a central bore 19 provided in a partition wall 20 interposed between the branch 15 of fitting 10 and the lower end of cylinder 16. The lower end of rod 18 carries an enlarged cleaning head 18a substantially conforming in section to the interior of cylinder 16 and pipe 11. The length of the plunger rod 18 is preferably such that when the head member 18a rests against the lower side of the partition 20, the piston 17 will be slightly spaced from the upper end plate 16a of the cylinder 16. The bore 19 in the partition wall 20 is preferably somewhat larger in cross sectional area than that of the plunger rod 18, whereby a small amount of liquid may flow between the rod 18 and the partition 20.

A fluid supply-conduit 21 is connected to the upper end of the cylinder 16 and a second fluid supply conduit 22 is connected to the lower end of the cylinder at a point above the partition plate 20. A fluid supply line 23 is connected to the branch 15 of the fitting 10 whereby fluid may be supplied directly into the outlet conduit 7 of the chamber 5 in addition to the liquid sprayed from the member 9, and that which flows past the plunger-rod 18. The line 22 leads from a suitable source of fluid supplied thereto under a suitable pressure. The line 22 is provided with a valve 24 and is connected on each side thereof to branch-pipes 25 and 26 provided with valves 27 and 28 respectively. The line 26 is connected to the line 22 at a point intermediate valve 24 and the point of connection of line 22 with the cylinder 16 and at its other end is connected to the line 23 leading to the branch 15. The line 25 is connected to line 22 at a point on the other side of valve 24 and is connected at its other end to the line 21 leading to the upper end of the cylinder 16. The lines 21 and 23 are connected by means of a line 29 provided with a valve 30.

In operating in accordance with the invention, a suitable fluid, such as oil, may be supplied under pressure to the lines 23 and 22 simultaneously, sufficient pressure being maintained in the cylinder 16 on the lower side of piston 17 to maintain it in elevated position (as shown). Oil flows into the conduit 7 through line 23, some flowing into the conduit 7 from the cylinder 16 through the space between the walls of the bore 19 in partition-plate 20 and the plunger rod 18. When it is desired to force the plunger rod 18 downwardly through branches 15 and 11 of conduit 7 and the opening 6 and into the reaction chamber 5, to clean pipe 11, valves 24 and 30 may be closed and valves 27 and 28 may be opened. Oil then passes from line 22 through line 25 to line 21 whereby the piston 17 will be forced downwardly in the cylinder 16, and the body of oil in the cylinder below the piston 17 is forced out through line 22 and flows through lines 26 and 23 and discharges into the outlet conduit 7. When the piston 17 has been forced downwardly to the desired point, valves 27 and 28 are closed and valves 24 and 30 are opened. The oil then flows directly through line 22 into the cylinder 16 below piston 17 causing the latter to be forced upwardly, and the body of oil in cylinder 16 above the piston 17 is forced out through lines 21, 29, and 23 and is discharged into the conduit 7, and/or chamber 5. When the piston 17 reaches the upper limit of its stroke the valve 30 may be closed and the valve 28 is partly or entirely opened to permit oil to flow from line 22 to line 23 and into conduit 7. It will thus be seen that at all times fluid, such as oil, may be constantly supplied to conduit 7 and the fluid so supplied may be utilized to operate the plunger cleaning device without substantial interruption of the supply of such fluid or oil to the conduit 7.

The device may be employed in connection with any type of a reaction chamber employed in an apparatus to which fluid is supplied for treatment, a portion of the fluid so supplied being employed to operate the cleaning device. The device is free from packing glands and the leakage of fluid past the plunger rod 18 functions to keep the device from being rendered inoperative by heavy reaction products, such as coke or carbon in the case of treating oil. The device may be employed in connection with reaction chambers for the liquid, vapor phase or mixed liquid-vapor-phase conversion of hydrocarbon oils, any portion of the liquid oil supplied to the system being employed to operate the cleaning device for the removal of coke depositions from the vicinity of the outlet of the chamber.

Thus in the embodiment shown, the oil employed to operate the device may comprise a suitable clean fresh stock suitable as charging stock for a cracking operation. The fresh oil upon its discharge into the reaction chamber 5, or the outlet conduit 7, will become vaporized and admix with the vaporous products passing through the conduit 7. These vapors may be passed to a suitable fractionating operation wherein the fresh oil vapors will be condensed and thereby separated as reflux condensate along with the insufficiently converted constituents of the vaporous conversion products. This condensate stock may then be passed to the system for further conversion.

It will be understood that the line 23 may be connected to line 8 so that the fluid may be discharged from line 23 into the interior of the reaction chamber 5 through the nozzle 9, as well as into the conduit member 7. Thus, a valved line 8' may interconnect the lines 8 and 23 for this purpose. In order to expedite the operation of the device it may be desirable to relieve the pressure within the reaction chamber 5 during the downward stroke of the piston 17 and the cleaning head 18a. This may be accomplished in any suitable manner. Thus, the lower portion of the chamber may be provided with an outlet line (not shown) which may be opened to cause the pressure within the interior of the chamber 5 to drop to the desired extent during movement of the cleaner head 18a into the pipe 11 and opening 6.

It will be understood that the area of the head of the piston 17 may be considerably greater than that of the cleaner head 18a so that a greater force may be exerted on the cleaner 18a with a given fluid pressure in the cylinder 16. Also it will be clear that the cleaner head 18a may be of any desired shape or form and need not necessarily be of the type shown in the drawing.

The valves 24, 27, 28, and 30 may be operated by inter-connected mechanism so that for any phase of the operation of the device the valves may be simultaneously operated.

While the invention has been shown in connection with an outlet passageway of a conversion chamber it is to be understood that it may be employed as well for the removal of heavy or solid reaction products from any passageway through which hydrocarbons are passed while at conversion temperature. For example, the cleaning device of the present invention may be employed in connection with the inlet passageway or transfer line through which hydrocarbons heated to reaction temperature are passed into a reaction zone or chamber.

We claim:

1. An apparatus for removing accumulated deposits from the outlet conduit of a reaction chamber adapted to contain hydrocarbon oil maintained at conversion temperature, a second chamber exterior of said reaction chamber and connected to said outlet conduit, a partition between said second chamber and said outlet conduit provided with an opening, an elongated member having cleaning means connected thereto carried carried within said second chamber and extending through the opening in said partition into said outlet conduit, said cleaning means connected to said member being adapted to be moved through said outlet conduit and into said reaction chamber for removing accumulated reaction products from said outlet conduit, fluid-displaceable means within said second chamber and connected to said elongated member for effecting said movement of said member upon displacement of said means, and means for supplying fluid to said second chamber for displacing said displaceable means, said elongated member having a cross-sectional area substantially smaller than the cross-sectional area of the said opening in said partition whereby said fluid supplied to said second chamber may flow past the said elongated member and into the said outlet conduit.

2. An apparatus for removing accumulated deposits from the outlet conduit of an oil conversion chamber comprising a cylinder exterior of said oil conversion chamber and in alignment with said outlet conduit, a piston within said cylinder, means for periodically supplying oil to alternate sides of said piston, means for simultaneously withdrawing oil from the opposite side of said piston to thereby actuate the same, a cleaning element positioned within the outlet conduit, connecting means between said piston and said cleaning element to cause movement of said cleaning element when said piston is actuated and means for delivering oil withdrawn from the cylinder into the oil conversion chamber immediately adjacent the outlet conduit.

3. An apparatus for removing accumulated deposits from the outlet conduit of an oil conversion chamber comprising a cylinder exterior of said oil conversion chamber and directly connected to said outlet conduit, a partition wall having a central opening interposed between said cylinder and said conduit, a piston within said cylinder, means for alternately supplying oil under pressure to said cylinder at opposite sides of said piston, means for alternately withdrawing oil from the side of said piston opposite that to which the oil is being supplied to thereby reciprocate said piston, means for discharging said withdrawn oil into the conversion chamber, a plunger disposed in the outlet conduit and normally positioned out of the path of the products being withdrawn therefrom and a piston rod connecting said piston with said plunger and extending through the central opening of said partition to thereby reciprocate said plunger through said conduit and into the reaction chamber.

4. An apparatus for removing accumulated deposits from the outlet conduit of a reaction chamber, adapted to contain hydrocarbon oil maintained at conversion temperature, which comprises a cylinder exterior of the chamber and having one of its ends opening into the interior of the conduit and its other end closed, a partition-wall interposed between said cylinder and the conduit and having an opening therethrough, an elongated member having cleaning means connected thereto within said cylinder and extending through the opening in said partition-wall into the said conduit, said cleaning means connected to said member being adapted to be longitudinally reciprocated outwardly of said cylinder through said conduit and into said reaction chamber and back into said cylinder, thereby removing accumulated reaction products from said outlet conduit, a piston within said cylinder and secured to said elongated member, means for alternately supplying fluid under pressure to said cylinder to either side of said piston, thereby reciprocating said piston and said elongated member, and means for discharging the fluid supplied to said cylinder into the said conduit, said elongated member having a cross-sectional area substantially smaller than the cross-sectional area of said opening in said partition-wall whereby said fluid supplied to said cylinder may flow past the said elongated member and into the said conduit.

5. A cleaning apparatus for removing accumulated deposits from the outlet conduit of an oil conversion chamber comprising cleaning means adapted to traverse said conduit, and means for continuously supplying oil to said conduit, with means for effecting the traversing and moving of said cleaning means by the oil supplied to said conduit, said means comprising a piston chamber communicating with said conduit, a piston within said chamber and adapted to operate the cleaning means, conduits communicating with the interior of said chamber at opposite ends thereof whereby oil may be supplied to either side of said piston, lines connecting said conduits with the means for introducing oil into the conduit for conversion products and with a source of supply for the oil, and valve control means in said lines whereby oil may be supplied to one side of the piston to cause movement thereof and to cause oil discharged from the other side of the piston to enter said means for supplying oil to the said conduit for conversion products.

6. A cleaning apparatus for removing accumulated deposits from the outlet conduit of a reaction chamber adapted to contain hydrocarbon oil maintained at conversion temperature, comprising a cylinder exterior of said chamber and having one of its ends opening into the interior of said conduit and its other end closed, a partition wall interposed between said cylinder and said conduit and having an opening therethrough, an elongated member having cleaning means connected thereto within said cylinder and extending through the opening in said partition-wall into the said conduit, said cleaning means connected to said member being adapted to be longitudinally reciprocated through said conduit and into said reaction chamber, thereby removing accumulated reaction products from said outlet conduit, a piston within said cylinder and secured to said elongated member, means for alternately supplying fluid under pressure to said cylinder to either side of said piston, thereby reciprocating said piston and said elongated member, and means for discharging the fluid supplied to said cylinder into the said reaction chamber, said elongated member having a cross-sectional area substantially smaller than the cross-sectional area of said opening in said partition-wall whereby said fluid supplied to said cylinder may flow past the said elongated member and into the said conduit.

7. An apparatus for removing accumulated deposits from a conduit leading from an oil conversion chamber, wherein the conduit changes its direction immediately upon leaving the chamber, comprising a tubular extension leading from said conduit in alignment with the mouth thereof, a closure plate for the end of said extension, said closure plate and extension forming a recess in direct communication with said conduit, a plunger normally positioned in said recess, means for operating said plunger to dislodge deposits from the mouth of said outlet and means for introducing a stream of relatively cool hydrocarbon oil into said recess to prevent said plunger from being rendered inoperative by deposition of reaction products within said recess.

HAROLD R. SNOW.
RUSSELL L. ZIMMERMAN.